C. Oyston,

Nozzle,

No. 2,196. Reissued Mar. 13, 1866.

Witnesses:
J. W. Coombs
G. W. Reed

Inventor:
Charles Oyston
per Munn & Co
attorneys

N. PETERS, PHOTO-LITHOGRAPHER, WASHINGTON, D. C.

UNITED STATES PATENT OFFICE.

CHARLES OYSTON, OF LITTLE FALLS, NEW YORK.

IMPROVEMENT IN NOZZLES.

Specification forming part of Letters Patent No. 39,674, dated August 25, 1863; Reissue No. 2,196, dated March 13, 1866.

*To all whom it may concern:*

Be it known that I, CHARLES OYSTON, of Little Falls, in the county of Herkimer and State of New York, have invented a new and useful Improvement in Nozzles for the Discharge of Water to be used in Extinguishing Fires; and I do hereby declare that the following is a full, clear, and exact description thereof, reference being had to the accompanying drawings, making part of this specification, in which—

Figure 1:
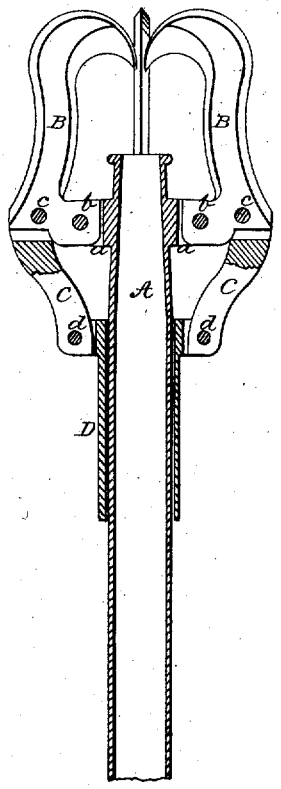
Figure 2:
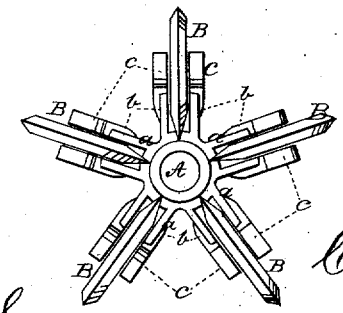

Figure 1 is a longitudinal section of a nozzle with my invention applied, and Fig. 2 an end view thereof.

The same letters indicate like parts in both figures.

My invention consists in combining with a nozzle for the discharge of water a series of wings to cut and divide the issuing stream of water, and thereby divide it and cause it to spread; and my said invention also consists in making the said wings movable, so that the operator while using the nozzle can move them out of the way to throw an unbroken stream of water, or move them in place to break and divide the issuing stream.

In the accompanying drawings, A represents a nozzle of the usual construction for extinguishing fires. From the outer surface of this nozzle, and near the extreme end thereof, project a series of brackets, *a*, to which are hinged the inner ends, *b*, of the stems of what I denominate the "dividers" or "divergers" B, and these are in turn connected by joint-links C to a sleeve, D, adapted to slide freely on the nozzle, the said joint-links being connected to the levers of the dividers or divergers by pins *c*, and with ears on the sleeve by pins *d*. The acting ends of the dividers or divergers are wedge shape, to present a cutting-edge to the issuing stream of water, so as to present as little resistance as possible.

When the sleeve D is pushed toward the extreme end of the nozzle, the dividers are brought to the position represented in Fig. 1 of the drawings, so that their extreme ends will be in line, or nearly so, with the axis of the nozzle, in which position they will divide the issuing stream of water and cause the several sections thereof to diverge and spread to a greater or less extent, depending upon the angle of the wedge-like faces to the planes of the axis of the nozzle; and when the sleeve is drawn back the dividers are all drawn away, as shown in Fig. 2 of the drawings, so that the issuing stream of water will not touch them. In this way the operator can readily control the dividers and operate the nozzle with or without them, and shift them even while the stream of water is issuing.

The advantages of my said invention will be readily appreciated. A fire can be extinguished by means of water in two ways, either by reducing the temperature below the point of combustion, or by cutting off the supply of atmospheric air which supplies oxygen, the supporter of combustion. So long as the fire occupies a small area, an unbroken stream of water playing upon it will soon extinguish it; but when it occupies a large area an unbroken stream of water is of comparatively little effect, for the reason that it cannot play upon the whole of the ignited surface at the same time, and while the stream of water is playing upon a portion of the surface, combustion is increasing in other portions, and the heat in any one portion is not sufficient to evaporate all the water that is thrown in that direction, and as much heat is absorbed and becomes latent in evaporating water, it follows that the more water that is evaporated the greater will be the reduction of the fire. Now, by dividing and spreading the issuing stream of water in a room, for instance, in which a fire is raging, the water will be evaporated more rapidly, and hence the temperature will be more quickly reduced and the fire extinguished, and the steam thus generated will drive and keep off the supply of atmospheric air, and thereby tend to extinguish the fire; and although a nozzle with the dividers will more quickly extinguish a fire in a room or other inclosure than without it, still there are many instances in the progress of a fire in which it is very desirable to be able to throw an unbroken stream of water, and therefore it is advantageous to be able to readily shift the dividers so that the operator can use the nozzle with or without them.

What I claim as my invention, and desire to secure by Letters Patent, is—

1. The combination of the dividers or divergers, substantially as described, with a water-nozzle, substantially as and for the purpose specified.

2. Making the dividers or spreaders movable on the pipe, substantially as and for the purpose specified.

CHARLES OYSTON.

Witnesses:
S. F. BENNETT,
DENNIS COLLINS.